March 5, 1963  A. P. DELANEY  3,080,459
METAL ENCLOSED SWITCHGEAR
Filed Jan. 16, 1961  3 Sheets-Sheet 1

INVENTOR.
AUGUSTINE P. DELANEY
BY
Fred Winiott
ATTORNEY

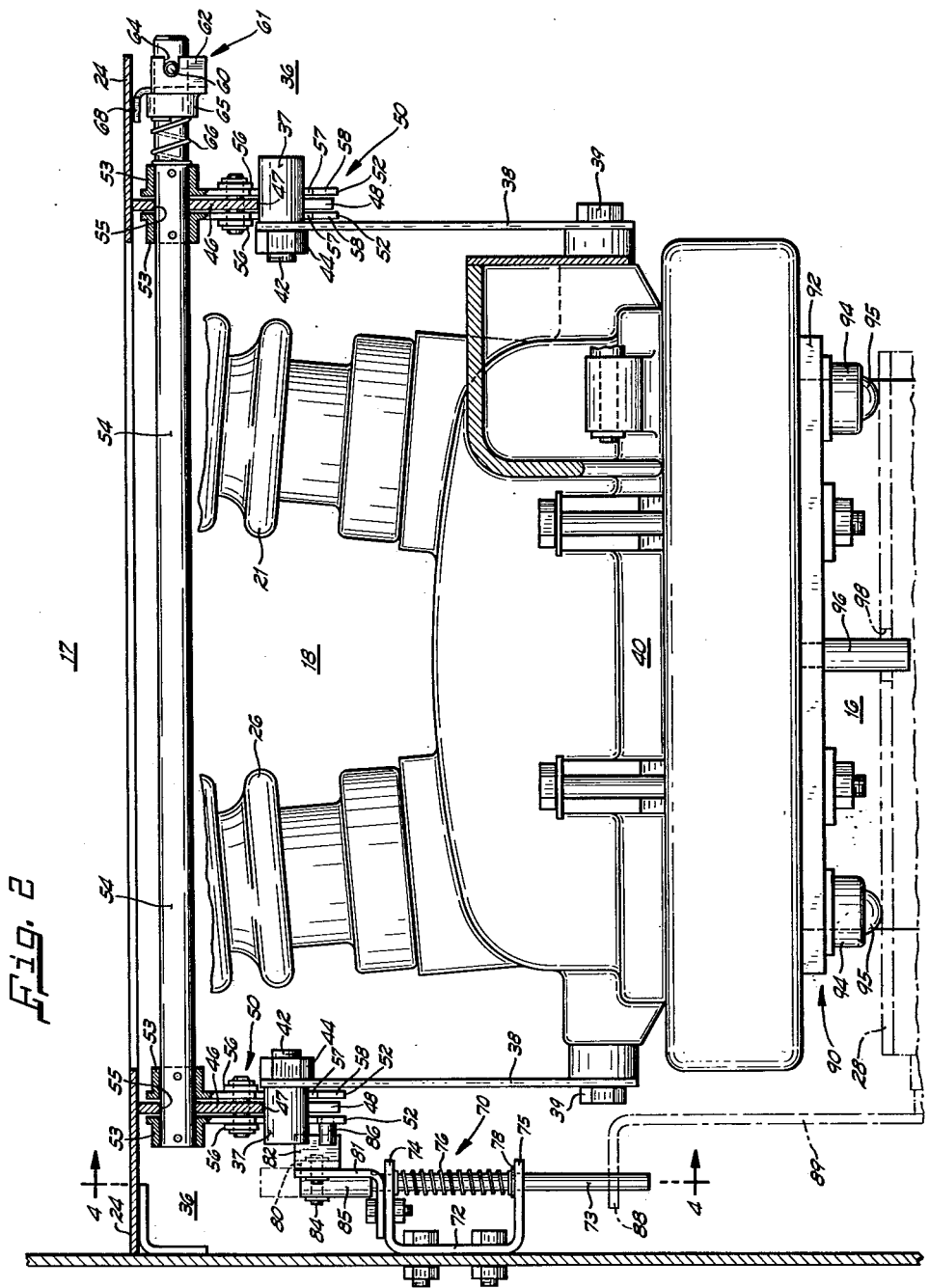

March 5, 1963 A. P. DELANEY 3,080,459
METAL ENCLOSED SWITCHGEAR
Filed Jan. 16, 1961 3 Sheets-Sheet 3
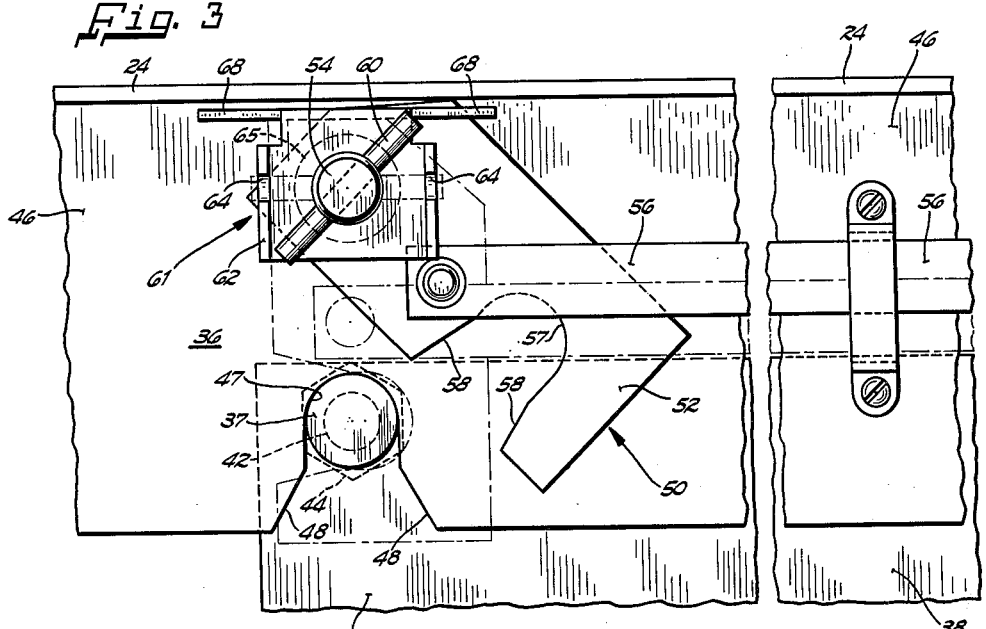
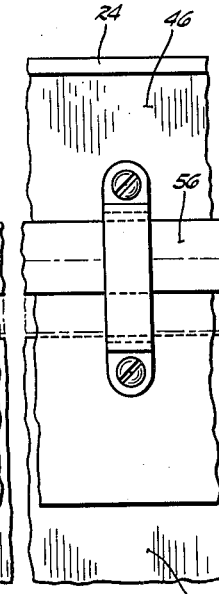
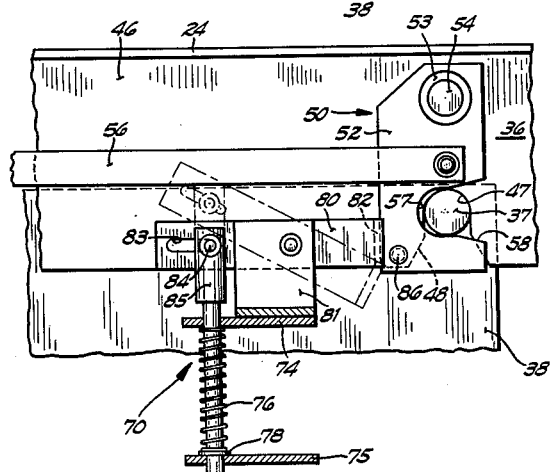
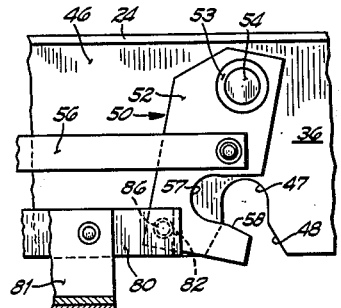
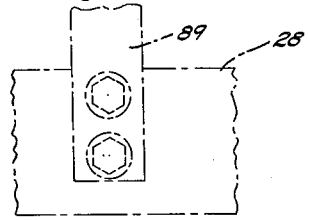
INVENTOR.
AUGUSTINE P. DELANEY
BY Fred Wiviott
ATTORNEY United States Patent Office 3,080,459
Patented Mar. 5, 1963

3,080,459
METAL ENCLOSED SWITCHGEAR
Augustine P. Delaney, South Milwaukee, Wis., assignor to McGraw-Edison Company, Milwaukee, Wis., a corporation of Delaware
Filed Jan. 16, 1961, Ser. No. 82,760
9 Claims. (Cl. 200—50)

This invention relates to metal enclosed switchgear and, more particularly, to circuit breaker support means for metal enclosed switchgear of the drop-down type.

In metal enclosed switchgear of the drop-down type, a circuit breaker is operatively mounted for vertical movement between connected and disconnected positions with respect to stationary circuit and bus bar structure. The assembly also includes a metallic supporting frame, stationary circuit and bus bar structure disposed in its upper portion and a suitable circuit breaker elevating mechanism. By lowering the circuit breaker to its disconnected position it may be isolated from the stationary bus bar structure for servicing and test purposes. When the circuit breaker is elevated, disconnect contacts carried by it engage stationary contacts on the bus bar structure thereby connecting a feeder circuit to the main bus.

Because the circuit breaker units in such assemblies are generally of the three-phase type, the circuit breaker is provided with three incoming and three outgoing movable disconnect contacts while six stationary disconnect contacts are mounted in the upper portion of the metallic housing. In order for there to be proper connection of the circuit breaker, therefore, not only must each of the movable disconnect contacts be in vertical alignment with its associated stationary contact but a plane containing corresponding portions of the movable disconnect contacts must be parallel to a plane containing corresponding portions of the stationary disconnect contacts. This is necessary so that each of the corresponding movable and stationary disconnect contacts will be fully mated when the circuit breaker unit reaches the upper limit of its vertical travel. In other words, for proper connection between the movable and stationary disconnect contacts there must be both vertical and horizontal alignment.

It is an object of the invention to provide a metal enclosed switchgear unit with means for providing horizontal and vertical alignment between the fixed and movable disconnect contacts.

Another object of the invention is to provide, in a switchgear assembly having a mechanism for vertically moving a circuit breaker unit in its supporting structure, new and improved means for supporting the circuit breaker unit independently of the vertical lift means. A further object of the invention is to provide in such switchgear assemblies, means for preventing the movement of said supporting means into or out of its supporting position if said lift mechanism is not in its elevated position.

Other objects and advantages of the invention will become apparent from the detailed description of the invention taken with the accompanying drawings in which:

FIG. 2 is an elevational view, partly in section, of the circuit breaker support mechanism;

FIG. 3 is an elevational view of a portion of the circuit breaker support mechanism shown in FIG. 2; and FIGS. 4 and 5 show the support mechanism interlock assembly.

Figure 1:
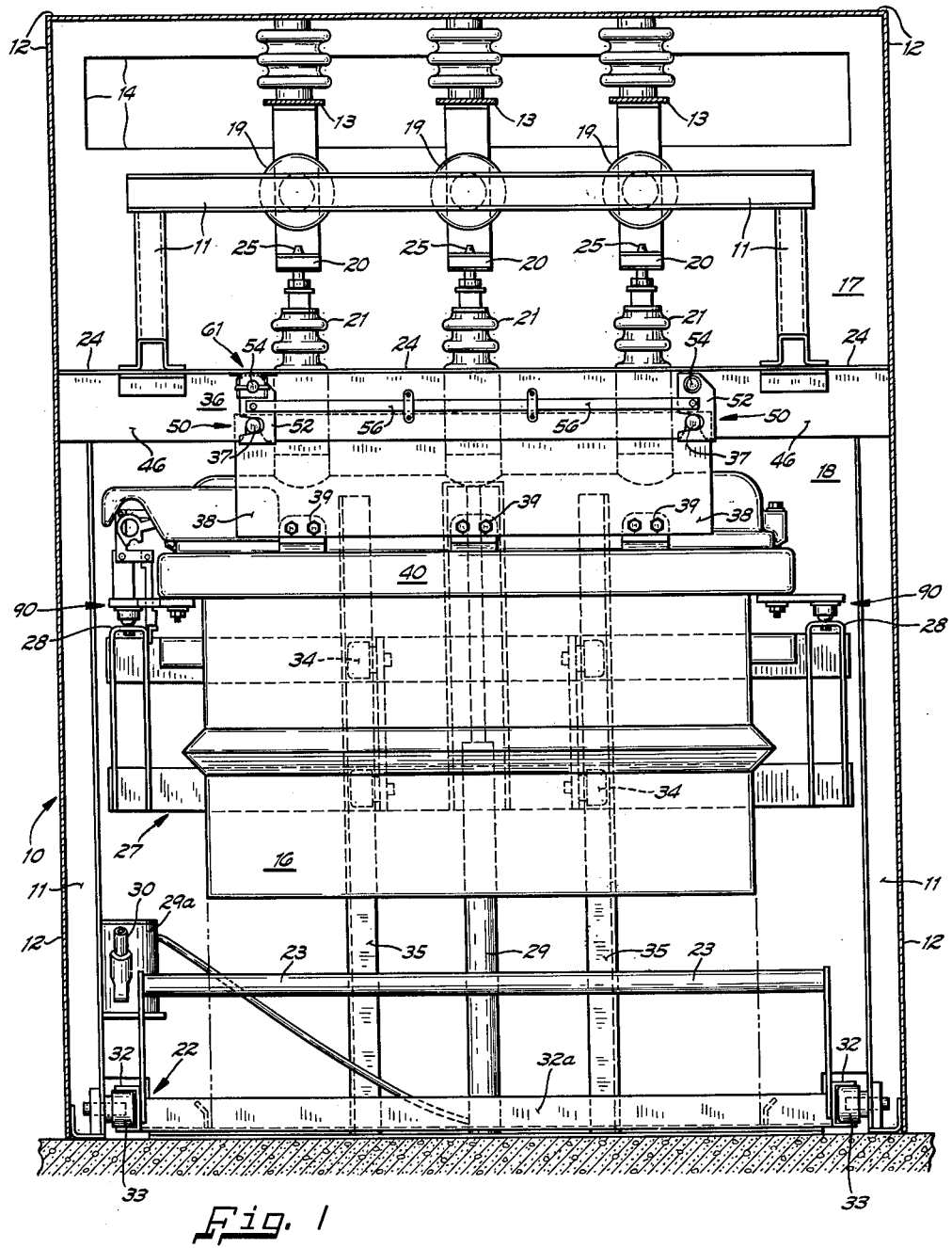
FIG. 1 is an elevational view of metal enclosed switchgear embodying the present invention with parts of the metallic housing broken away.

In general terms, the invention comprises a switchgear assembly having a supporting frame, a switchgear unit movable vertically within said frame and a plurality of support members mounted in spaced relation around said circuit breaker unit. In addition, mounting means are disposed on the upper portion of the frame and in the path of the support members and arranged to be engaged thereby as the switchgear unit is raised, and a plurality of support arms are pivotally mounted on the support means and have engaging means formed therein. Also, operating means is provided for pivoting each of the support arms so that the engaging means will engage the support members to support said circuit breaker in its elevated position. In addition, means may also be provided to prevent the operation of the support arms into or out of their engaged position when the switchgear lifting mechanism is not in its elevated position.

According to another of its aspects, the invention also includes a switchgear assembly having a supporting frame with a plurality of stationary disconnect contacts mounted in its upper portion, a circuit breaker unit having a plurality of movable disconnect contacts mounted thereon and being movable vertically within the frame between connected and disconnected positions relative to the stationary disconnect contacts. In addition, fulcrum means including a plurality of elements are provided in spaced relation on said circuit breaker unit and movable therewith. The fulcrum means also including a plurality of fixed pivot means mounted on the frame and each is arranged to be engaged by one of the elements as the circuit breaker unit is raised toward its connected position. Also, each of the elements is substantially the same distance from a plane containing corresponding portions of the movable disconnect contacts as its coacting fixed pivot means is from a plane containing corresponding portions of the stationary disconnect contacts so that the circuit breaker unit will pivot around the first one of the fixed pivot means to be engaged by its associated element to move the remainder of said elements toward their engaged positions, should misalignment exist between the fixed and movable disconnect contacts as the circuit breaker unit is being raised toward its closed position.

Referring now to the drawings in greater detail, FIG. 1 shows a metal enclosed switchgear unit which includes a cubicle 10 formed of a metallic frame 11 and sheet metal walls 12. A number of such units are usually disposed in side-by-side abutment so that various distribution circuits can be supplied and controlled from a common substation. Power is supplied to each distribution circuit from common bus bars 13 which extend through openings 14 in the sides of each unit. The power supply or incoming bus bars 13 are connected to the outgoing or distribution system bus bars (not shown) through a circuit breaker 16 disposed in cubicle 10.

Cubicle 10 is partitioned into an upper compartment 17 and a lower compartment 18. The incoming bus bars 13 of each phase are supported in the upper compartment 17 and each is insulated from the metallic frame 11 by insulators 19. Mounted below insulators 19 and electrically connected to the incoming bus bars 13 are the incoming stationary disconnect contacts 20. In horizontal spaced relation with the incoming stationary contacts 20 are the outgoing stationary disconnect contacts (not shown) which are electrically connected to the outgoing bus (not shown).

The three phase circuit breaker 12, disposed in the lower compartment 18, has line terminals 21 which extend through suitable openings in the panel 24 separating compartments 17 and 18 when the circuit breaker is in its connected position as shown in FIG. 1. Each line terminal 21 is provided with a movable disconnect contact 25 which engages one of the stationary disconnect contacts 20 when the circuit breaker is in said connected position. Similarly, as illustrated in FIG. 2, the circuit breaker 12 is provided with load terminals 26, each of which also extends into the upper compartment 17, and each of which is provided with a movable load disconnect contact (not shown) which engage stationary load disconnect contacts (not shown) when the device is in its connected position.

A lifting mechanism 27 is provided for raising and lowering the circuit breaker 12 between its connected and disconnected positions, and while any suitable type may be employed, a hydraulic jack is shown for purposes of illustration. This lifting mechanism includes a vertically movable carriage 28 upon which circuit breaker 12 rests and a first hydraulic cylinder 29 for driving the carriage 28. A second hydraulic cylinder 29a is mounted on the frame 11 and is operable by means of a handle 30 to force hydraulic fluid through a conduit 31 to the first hydraulic cylinder 29. Pairs of spaced rollers 34 mounted on the carriage 28 engage each of a plurality of vertically mounted rails 35 disposed on each side of the cubicle 10 so that the circuit breaker 16 is guided in substantially vertical straight line motion toward the stationary disconnect contacts 20. After the circuit breaker 12 has been raised to its connected position, a pinning mechanism 36 is operated to its supporting position so that the circuit breaker is supported independently of the hydraulic lifting mechanism 27.

A drawout truck 22 is provided for moving the circuit breaker 16 horizontally into and out of chamber 18 and includes a pair of parallel channel members 32 which embrace rollers 33 mounted in frame 11. The channel members 32 are joined by cross members 32a and a drawout handle 23. As the circuit breaker 16 is being lowered by the lift mechanism 27, it will come to rest on the cross members 32a whereby the lift mechanism 27 clears upon further downward movement allowing withdrawal of truck 22 and circuit breaker 16 independently of the lift mechanism 27.

Referring now to FIGS. 2 and 3, the pinning mechanism 36 is shown to include a pair of support pins 37 mounted on each of the lateral sides of the circuit breaker 12 by a bracket plate 38 affixed by bolts 39 to each side of the head 40 of circuit breaker 12. Each of the support pins has a threaded end 42 which is received through an aperture in the plates 38 and which is affixed therein by a nut 44 so that it extends generally normal to plate 38 and the lateral sides of circuit breaker 12.

A pair of support panels 46 are affixed to the frame 11 adjacent and substantially parallel to plates 38 when the circuit breaker 16 is in its connected position shown in FIG. 1. A pair of guide slots 47 are formed in each of the support panels 46 for receiving the support pins 36 and each is flared outwardly at its mouth 48 so that the circuit breaker 12, and thus the movable disconnect contacts 25, will be guided into position as circuit breaker 12 is raised. The guide slots 47 are so positioned that corresponding portions of each lie in a plane parallel to a plane containing corresponding points in the stationary disconnect contacts 20. Similarly, a plane containing corresponding points on the support pins 37 is parallel to a plane containing corresponding portions of the movable disconnect contacts.

It will be appreciated that not only do the guide slots 47 facilitate horizontal alignment of the movable disconnect contacts 25 relative to the stationary disconnect contacts 20, but they also form a stop to limit the upward movement of each of the support pins 37. Thus, if the circuit breaker 12 is tilted slightly at an angle relative to the supporting frame 11, so that a plane containing corresponding portions of the movable disconnect contacts 25 is not parallel to a plane containing corresponding portions of the stationary disconnect contacts 20, one or a pair of the support pins 37 will become seated in their associated guide slots 47 prior to the remaining support pins. The first of such support pins 36 to become seated then becomes a fulcrum around which the entire circuit breaker 12 pivots until the remaining support pins 37 have been moved sufficiently toward their seated position so that they may be picked up by the locking mechanism 50 and moved into seated position in the manner described in the ensuing paragraphs. This is true whether or not the first pair of support pins to engage are on the same side of the circuit breaker 12 or corresponding ones on the opposite side thereof. In addition, this action will occur even if there is only initial seating of a single support pin 36. Upon the latter event, the circuit breaker 12 will pivot in two directions until all support pins 36 have been moved into the desired position. In this manner, horizontal alignment between the fixed and movable disconnect contacts 20 and 25 is achieved.

In order to maintain circuit breaker 12 in its connected position and to fully seat each of the support pins 37 in their associated guide slots 47, a locking assembly 50 is provided. This assembly 50 includes pairs of locking arms 52 disposed on each side of the guide plate 46 adjacent the guide slots 47 and which are adapted to cooperatively engage one of the support pins 37. Each of the locking arms 52 has an integral collar 53 formed in one end thereof and each pair is pinned near one end of a pair of operating shafts 54 which are journalled for rotation in aligned apertures 55 formed in the guide plates 46. In this manner, the locking arms 52 in each pair are connected with each other and to the pair of locking arms on the opposite side of the circuit breaker 12. Similarly, a link 56 connects the outside ones of the locking arms 52 on the same side of the circuit breaker 12 so that all will rotate in unison.

Each of the support arms 52 has a transverse slot 57 formed therein whose open side is disposed toward the guide slot 48 so that when the circuit breaker 12 is in its connected position, rotation of the operating shafts 54 in a clockwise direction, as viewed in FIG. 3, will pivot the locking arms 52 clockwise and thereby move the locking slot 57 into engagement with the support pins 36. In this manner, the weight of the circuit breaker 12 is transferred from the lifting mechanism 26 to the frame 10.

As it will be recalled from the foregoing discussion, if horizontal misalignment of the circuit breaker 16 occurs during a raising operation, it will be pivoted around the first of the pins 37 to make contact with its associated slot 47 until the remaining pins 37 approach a similar position. If these remaining pins 37 do not thereby become fully seated, they will be engaged by the wedge-shaped lower edge 58 of slots 57 as arms 52 are rotated, which then elevates them slightly into their seated positions. Rotational movement of the locking arms 52, shown respectively by full and broken lines in FIG. 3, is accomplished by means of a lug wrench (not shown) engageable with lugs 60 extending through the extension of one of the operating shafts 54.

To hold the support arms 52 in their open or closed positions, a locking assembly 61 is provided. This assembly includes a U-shaped lock bracket 62 having locking slots 64 formed in each of its ends and which is carried by a sleeve 65 slidably mounted on shaft 54 as shown in FIG. 2. A spring 66, surrounding shaft 44 and disposed between one of the collars 53 and the sleeve 55, urges the locking assembly 61 to the right and slots 64 into engagement with the lugs 60. A planar stabilizing bracket 68 integral with the U-shaped bracket 62 and which extends rearwardly therefrom and parallel to the horizontal panel member 24, prevents rotation of the locking assembly 61.

It will be appreciated from FIG. 3 that swiveling of the supporting arms 52 when they are in their open positions shown by full lines in FIG. 3 will also be prevented by the sides of U-shape bracket 62 which lie in the rotational path of lug 60. Similarly, when supporting arms 52 are in their closed or supporting position, shown by broken lines in FIG. 3, swiveling movement thereof will be prevented by the engagement of lug 60 in slots 64. When it is desired to rotate the supporting assembly to its open or closed positions the locking assembly 61 will be uncoupled from lug 64 by means of a suitable extension on the end of the lug wrench which will move the U-shaped bracket 62 and sleeve 64 to the left as viewed in FIG. 2 and against the influence of spring 66.

As illustrated in FIG. 3, when the supporting arms 52 are in their nominally closed position the back of support slot 55 does not engage the support pin 47. This clearance is provided so that if there is misalignment between any of the support pins 47 and support recesses 55 none of said pins will be engaged by the back of said slot to prevent further pivotal movement of the remaining support arms 52 prior to their becoming fully seated.

It can be seen that if the support arms 52 should be mistakenly rotated while the circuit breaker 12 is in its connected position and after the lifting mechanism 27 has been lowered, there would be nothing to prevent the circuit breaker 12 from falling. In order to prevent such an occurrence, a support assembly interlock 70 is mounted by means of a U-shaped bracket 72 affixed to one of the side panels 12 and adjacent one of the support arms 52. The interlock 70 includes a plunger 73 reciprocably mounted in aligned apertures formed in the upper and lower arms 74 and 75 respectively, of bracket 70 and a spring 76 circumjacent plunger 73 and disposed between said arms. The upper end of spring 76 engages the upper arm 74 of bracket 72 and its lower end engages a washer 78 affixed to plunger 73 and which forms a stop for limiting the downward movement of plunger 73. Thus, plunger 73 is urged downwardly with washer 78 normally engaging the lower arm 75 of bracket 72.

The interlock 70 also includes an L-shaped interlock lever 80 pivotally mounted on a bracket 81 affixed to the upper surface of arm 74. Lever 80 has laterally extending arms 82 on its right hand end as viewed in FIG. 4 and a longitudinal slot 83 formed in its other end for slidably receiving a pin 84 extending through an enlarged head 85 formed in the upper end of plunger 73. When the lifting mechanism has been lowered, the interlock 70 will be in its position shown by full lines in FIG. 4 with the laterally extending arm 82 disposed adjacent a pin 86 affixed to the lower end of the cooperating support arm 52. Thus, with reference to FIG. 4, arm 84 prevents clockwise rotation of support arm 52 out of supporting engagement with pin 37. In addition, it will be recalled that each of the support arms 52 are interconnected by links 56 and shafts 54 so that all are thereby prevented from being rotated from their supporting position.

When the lifting mechanism 27 has been raised to a point where it supportingly engages the circuit breaker 12, the horizontal upper arm 88 of an inverted L-shaped bracket 89, shown in phantom in FIGS. 2 and 4, will engage the lower end of plunger 73 to rotate lever 80 in a clockwise direction to its phantom position in FIG. 4, thereby moving arm 84 away from the path of pin 86 to permit free rotation thereof. Lever 80 will remain in this position as long as the lifting mechanism 27 is in its elevated position. When the lifting mechanism is lowered, spring 76, acting on washer 78, will force plunger 73 downwardly to rotate lever 80 to its initial position.

Interlock 70 also performs the function of preventing the supporting arms 52 from being rotated to their supporting position after the circuit breaker has been lowered. It will be appreciated that if this were permitted the supporting arms 52 would block the slots 49 and thereby prevent the seating of pins 37 when the circuit breaker 12 is elevated. It will be recalled that in order to lower the circuit breaker 12 the support arms 57 must first be rotated and that as the circuit breaker 12 is being lowered spring 76 rotates lever 80 to its horizontal position. This places the pin 86 behind arm 84, as shown in FIG. 5, so that support arm 57 is prevented from being rotated fully back across slot 47 where it would be locked in that position by assembly 61.

In order to facilitate horizontal movement of the circuit breaker 12 relative to the support frame 27 a pair of transfer means 90 are provided between each of the opposite sides of said circuit breaker and corresponding portions of the carriage 28. Each of the transfer means 90 includes a plate 92 affixed to the underside of the circuit breaker's head 40 and a pair of ball transfer assemblies 94 having a ball 95 that engages carriage 28. In addition, a centering pin 96 extends downwardly from plate 92 through an aperture 98 formed in frame 27 to limit the degree of lateral movement of circuit breaker 12.

While only a single embodiment of the invention has been shown and described, it is intended to cover in the appended claims all such modifications that fall within the spirit and scope of the invention.

I claim:

1. In a switchgear assembly, the combination of, a supporting frame, a switchgear unit, lift means independent of said supporting frame for raising said switchgear unit vertically within said frame, a plurality of support members mounted in spaced relation around said circuit breaker unit, mounting means fixedly disposed on the upper portion of said frame and in the path of said support members and constructed and arranged to be engaged thereby as said switchgear unit is raised, a plurality of support arms pivotally mounted on said mounting means and having engaging means formed therein, operating means for pivoting each of said support arms so that said engaging means will engage said support members to support said circuit breaker in its elevated position independent of said lift means, and interlock means for preventing pivotal movement of said support arms out of engagement with said support members when said lift means has been lowered out of supporting engagement with said switchgear unit.

2. In a switchgear assembly, the combination of, a metallic supporting frame, a circuit breaker, lift means independent of said supporting frame for raising said circuit breaker vertically within said frame between connected and disconnected positions, a plurality of pin means mounted in spaced relation around said circuit breaker, mounting means fixedly disposed on the upper portion of said frame and having a plurality of pin receiving slots lying in the path of said pin means and arranged to be engaged thereby as said circuit breaker is raised toward its connected position, a plurality of support arms pivotally mounted on said mounting means and each having a pin engaging slot formed therein, operating means for rotating each of said support arms so that the pin engaging slots will engage said pin means to support said circuit breaker in its connected position independent of said lift means, and interlock means for preventing pivotal movement of said support arms out of engagement with said pin means when said lift means has been lowered out of supporting engagement with said switchgear unit.

3. In a switchgear assembly, the combination of, a metallic supporting frame, a circuit breaker, lift means independent of said supporting frame for moving said circuit breaker vertically within said frame between connected and disconnected positions, a plurality of pin means mounted on each of a pair of opposite sides of said circuit breaker and extending generally laterally thereof, fixedly mounted support means disposed on the upper portion of said frame and having a plurality of guide slots lying in the vertical path of said pin means and constructed and arranged to be engaged thereby as said circuit breaker is raised toward its connected position, a plurality of support arms mounted on said support means adjacent said guide slots and pivotal in planes substantially normal to said pin means and toward said slots, said support arms having a transverse pin engaging portion formed in the side thereof adjacent said guide slots, and operating means connected to each of said support arms for rotating them toward said guide slots so that the pin engaging portions will engage the underside of said pin means to support said circuit breaker in its connected position independent of said lift means, and interlock means for preventing the rotation of said support arms toward or away from said guide slots in the absence of said lift means.

4. In a switchgear assembly, the combination of, a supporting frame, a switchgear unit, lift means movable independently of said circuit breaker for raising and lowering the same within said frame, a plurality of support members mounted in spaced relation around said circuit breaker unit, mounting means fixedly disposed on the upper portion of said frame and in the path of said support members and arranged to be engaged thereby as said switchgear unit is raised, a plurality of support arms pivotally mounted on said mounting means and having engaging means formed therein, operating means for pivoting each of said support arms so that said engaging means will engage said support members to support said circuit breaker in its elevated position independently of said lift means, and means for preventing the pivotal movement of said support arms out of supporting relation to said switchgear unit in the absence of said lift means.

5. In a switchgear assembly, the combination of, a metallic supporting frame, a circuit breaker, lift means for moving said circuit breaker vertically within said frame, a plurality of pin means mounted on each of a pair of opposite sides of said circuit breaker and extending generally laterally thereto, support means disposed on the upper portion of said frame and having a plurality of guide slots lying in the vertical path of said pin means and arranged to be engaged thereby as said circuit breaker is raised toward its connected position, a plurality of support arms mounted on said support means adjacent said guide slots and pivotal in planes substantially normal to said pin means and toward said slots, said support arms having a transverse pin engaging slot formed in the side thereof adjacent said guide slots, operating means connected to each of said support arms for rotating them toward said guide slots so that the supporting slots will engage said pin means to support said circuit breaker in its connected position independently of said lift means, and interlock means disposed adjacent at least one of said support arms and including lever means having a portion disposed in the path of said support arm to prevent rotation thereof in the absence of said lift means, said lever being operatively engageable by said lift means for movement away from said path when said lift means has moved said circuit breaker to a position wherein said pins are in engagement with said guide slots.

6. In a switchgear assembly, the combination of, a supporting frame having a plurality of stationary disconnect contacts mounted in the upper portion thereof, a circuit breaker unit having a plurality of movable disconnect contacts mounted thereon and being movable vertically within said frame between connected and disconnected positions relative to said stationary disconnect contacts, fulcrum means including a plurality of elements mounted in spaced apart relation on said circuit breaker unit and movable therewith, said fulcrum means also including a plurality of fixed pivot means mounted on said frame and each arranged to be engaged by one of said elements as said circuit breaker unit is raised toward its connected position, each of said elements being substantially the same distance from a plane containing corresponding portions of said movable disconnect contacts as its coacting fixed pivot means is from a plane containing corresponding portions of said stationary disconnect contacts so that said circuit breaker unit will pivot around the first one of said fixed pivot means to be engaged by its associated element should misalignment exist between said fixed and movable disconnect contacts as said circuit breaker unit is being raised toward its closed position to move each of said elements toward their engaged positions, whereby horizontal realignment of said disconnect contacts may be achieved.

7. In a switchgear assembly, the combination of, a supporting frame having a plurality of stationary disconnect contacts mounted in the upper portion thereof, a switchgear unit having a plurality of movable disconnect contacts mounted thereon, and being movable vertically within said frame between connected and disconnected positions relative to said stationary disconnect contacts, a plurality of support members mounted in spaced apart relation around said switchgear unit, a plurality of stop means fixedly disposed on the upper portion of said frame, one of said stop means lying in the vertical path of each of said support members to arrest the upward motion thereof as said switchgear unit is raised toward its connected position, each of said support members being the same distance from a plane containing corresponding portions of said movable disconnect contacts as the distance of its associated stop means from a plane containing corresponding portions of said stationary disconnect contacts, so that said switchgear unit will pivot around the first one of said support means to engage its associated stop means should horizontal misalignment exist between said fixed and movable contacts as said switchgear unit is being raised toward its closed position to move the remainder of said support means toward their engaged positions, whereby horizontal realignment of said disconnect contacts may be achieved, and means mounted on said frame for supportingly engaging said support members to hold said switchgear unit in its elevated position.

8. In a switchgear assembly, the combination of, a supporting frame having a plurality of stationary disconnect contacts mounted in the upper portion thereof, a circuit breaker unit having a plurality of movable disconnect contacts mounted thereon and being movable vertically within said frame between connected and disconnected positions relative to said stationary disconnect contacts, a plurality of pin means mounted in spaced apart relation around said circuit breaker unit, corresponding portions of said pin means lying in a plane substantially parallel to a plane containing corresponding portions of said movable disconnect contacts, support means, pin receiving means disposed on the upper portion of said frame and lying in the vertical path of each of said pin means to provide a stop therefor as said circuit breaker is raised toward its connected position, corresponding portions of said pin receiving means lying in a plane substantially parallel to a plane containing corresponding portions of said stationary disconnect contacts, so that if horizontal misalignment exists between said fixed and movable disconnect contacts, the circuit breaker unit will pivot around the first one of said pin means to engage its associated pin receiving means as said circuit breaker unit is being raised toward its closed position until each of said pin means are in engagement whereby horizontal realignment of said disconnect contacts is achieved.

9. In a switchgear assembly, the combination of, a metallic supporting frame having a plurality of stationary disconnect contacts mounted in the upper portion thereof, a circuit breaker having a plurality of movable disconnect contacts mounted thereon and being movable vertically within said frame between connected and disconnected positions relative to said stationary disconnect contacts, a pair of pin members mounted on each side of said circuit breaker, stop means disposed on the upper portion of said frame and having a plurality of pin receiving slots formed therein, one of said slots lying in the vertical path of each of said pin means to provide a stop therefor as said circuit breaker is raised toward its connected position, the edges of said slots being flared outwardly so that said circuit breaker will be guided into vertical alignment relative to said stationary disconnect contacts, each of said pin members being substantially the same distance from a plane containing corresponding portions of said movable disconnect contacts as the distance of its associated slot from a plane containing corresponding portions of said stationary disconnect contacts so that said circuit breaker will pivot around the first one of said pin members to engage its associated slot should horizontal misalignment exist between said fixed and movable disconnect contacts as said circuit breaker is being raised toward its closed position to move each of said pin members toward their engaged positions whereby horizontal alignment of said disconnect contacts may be achieved, and means mounted on said frame for supportingly engaging said pin members to hold them in said pin receiving means.

References Cited in the file of this patent
UNITED STATES PATENTS
2,276,653    Hayford et al. _____ Mar. 17, 1942